(12) United States Patent
Zhang et al.

(10) Patent No.: US 12,293,221 B2
(45) Date of Patent: May 6, 2025

(54) CROSS-PROCESS DISPATCH SERVICE IN HYBRID CLOUD SCENARIOS

(71) Applicant: SAP SE, Walldorf (DE)

(72) Inventors: Le Zhang, Xi'an (CN); Daping Wang, Xi'an (CN); Haoxing Hou, Xi'an (CN); Moritz Semler, Spechbach (DE); Yu Yang, Xi'an (CN)

(73) Assignee: SAP SE, Walldorf (DE)

( * ) Notice: Subject to any disclaimer, the term of this patent is extended or adjusted under 35 U.S.C. 154(b) by 465 days.

(21) Appl. No.: 17/557,147

(22) Filed: Dec. 21, 2021

(65) Prior Publication Data

US 2023/0195515 A1 Jun. 22, 2023

(51) Int. Cl.
*G06F 3/00* (2006.01)
*G06F 9/48* (2006.01)
*G06F 9/50* (2006.01)

(52) U.S. Cl.
CPC .......... *G06F 9/4881* (2013.01); *G06F 9/5072* (2013.01)

(58) Field of Classification Search
CPC ...................................................... G06F 9/54
See application file for complete search history.

(56) References Cited

U.S. PATENT DOCUMENTS

| | | | |
|---|---|---|---|
| 6,598,075 B1 * | 7/2003 | Ogdon .................. | H04L 63/083 348/E7.083 |
| 7,152,220 B2 * | 12/2006 | Rickards, III ............ | G06F 8/71 717/101 |
| 8,032,846 B1 * | 10/2011 | Balasubramanian ... | G06F 30/30 716/139 |
| 9,965,209 B2 * | 5/2018 | Rao ........................ | G06T 11/206 |
| 10,733,522 B2 * | 8/2020 | Curtis ................. | G06F 16/9024 |
| 11,080,166 B2 | 8/2021 | Du et al. | |
| 11,709,878 B2 * | 7/2023 | Meyerzon ............. | G06F 16/355 706/46 |

(Continued)

FOREIGN PATENT DOCUMENTS

CN 108681482 B * 12/2020 ......... G06F 16/2379

OTHER PUBLICATIONS

John Whaley, Cloning-Based Context-Sensitive Pointer Alias Analysis Using Binary Decision Diagrams, (Year: 2004).*

(Continued)

*Primary Examiner* — Lechi Truong
(74) *Attorney, Agent, or Firm* — Fish & Richardson P.C.

(57) ABSTRACT

Methods, systems, and computer-readable storage media for receiving, by a cross-process scheduling engine executed within a cloud platform, work scenario metadata and sensitivity metadata, generating, by the cross-process scheduling engine, a lineage graph representing relationships between one or more of data and processes to be executed for a work scenario represented by the work scenario metadata, defining, by the cross-process scheduling engine, a set of tile segments for the work scenario based on the lineage graph and the sensitivity metadata, dispatching, by the cross-process scheduling engine, a first sub-set of tile segments for execution in a private deployment including one or more private nodes, and dispatching, by the cross-process scheduling engine, a second sub-set of tile segments for execution in a public deployment including one or more public nodes.

20 Claims, 5 Drawing Sheets

(56) References Cited

U.S. PATENT DOCUMENTS

| | | | | |
|---|---|---|---|---|
| 2008/0134138 | A1* | 6/2008 | Chamieh | G06F 8/41 |
| | | | | 717/105 |
| 2009/0150362 | A1* | 6/2009 | Evenhaim | G06F 21/6254 |
| 2015/0169758 | A1* | 6/2015 | Assom | G06F 16/36 |
| | | | | 707/603 |
| 2016/0071233 | A1* | 3/2016 | Macko | G06T 11/206 |
| | | | | 345/440 |
| 2017/0083588 | A1* | 3/2017 | Lang | G06F 16/24526 |
| 2017/0293534 | A1* | 10/2017 | Auvenshine | G06F 11/1464 |
| 2018/0096166 | A1* | 4/2018 | Rogers | G06F 16/951 |
| 2021/0150024 | A1* | 5/2021 | Koshti | G06F 21/577 |
| 2022/0334725 | A1* | 10/2022 | Mertes | G06F 3/065 |
| 2024/0111766 | A1* | 4/2024 | Newman | G06F 16/9024 |

OTHER PUBLICATIONS

Lorenz Fischer, Workload Scheduling in Distributed Stream Processors using Graph Partitioning. (Year: 2015).*
Gregory D Graff,The public-private structure of intellectual property ownership in agricultural biotechnology. (Year: 2003).*
U.S. Appl. No. 17/482,914, filed Sep. 23, 2021, Wang et al.

* cited by examiner

CROSS-PROCESS DISPATCH SERVICE IN HYBRID CLOUD SCENARIOS

BACKGROUND

Software systems can be provisioned by software vendors to enable enterprises to conduct operations. Software systems can include various applications that provide functionality for execution of enterprise operations. In some instances, software vendors provide software systems as off-premise applications that are executed in cloud computing environments, which can be referred to as cloud-based applications (e.g., applications provided in a so-called Software-as-Service (SaaS) deployment). Cloud-based applications can be provided in a public cloud or a private cloud. In some examples, a public cloud is a SaaS deployment that is agnostic to enterprises, while a private cloud is a SaaS deployment that is specific to a respective enterprise. In some instances, software vendors provide software systems as on-premise applications that are executed locally by enterprises (e.g., applications provided in a so-called edge deployment). As such, on-premise can be considered a private deployment that is specific to a respective enterprise.

In some instances, software systems are provided in hybrid deployments that include a private deployment (e.g., on-premise, private cloud) and public deployment (e.g., public cloud). For example, a set of functionality of an application can be executed in a private cloud and another set of functionality of the application can be executed in a public cloud. That is, the application can be a cross-deployment application. A hybrid deployment is typically used in instances of sensitive data and/or workflows, or otherwise providing enterprise-specific features and functionality that are unavailable through a public cloud. In hybrid deployments, there are some components executed as a public cloud-based service (e.g., components related to processes spanning different on-premise deployments or integrated with other cloud-based processes). However, hybrid deployments raise numerous technical problems including, for example, data migration and replication between private deployments and public deployments, as well as data security and compliance.

SUMMARY

Implementations of the present disclosure are directed to a cross-process dispatch service in hybrid cloud deployments. More particularly, implementations of the present disclosure are directed to a cross-process dispatch service in hybrid cloud deployments that dispatches processes of work scenarios with appropriate workloads for distribution between private cloud and public cloud systems.

In some implementations, actions include receiving, by a cross-process scheduling engine executed within a cloud platform, work scenario metadata and sensitivity metadata, generating, by the cross-process scheduling engine, a lineage graph representing relationships between one or more of data and processes to be executed for a work scenario represented by the work scenario metadata, defining, by the cross-process scheduling engine, a set of tile segments for the work scenario based on the lineage graph and the sensitivity metadata, dispatching, by the cross-process scheduling engine, a first sub-set of tile segments for execution in a private deployment including one or more private nodes, and dispatching, by the cross-process scheduling engine, a second sub-set of tile segments for execution in a public deployment including one or more public nodes. Other implementations of this aspect include corresponding systems, apparatus, and computer programs, configured to perform the actions of the methods, encoded on computer storage devices.

These and other implementations can each optionally include one or more of the following features: actions further include executing a private support agent within each private node of the one or more private nodes, the private support agent providing private node metadata to a cloud data sharing service, and executing a public support agent within each public node of the one or more public nodes, the public support agent providing private node metadata to a cloud data sharing service; the sensitivity metadata includes an indication of one or more of security-sensitivity and compliance-sensitivity of each of one or more of data to be processed in the work scenario and one or more processes of the work scenario; the sensitivity metadata is provided to the cross-process scheduling engine from a cloud data sharing service that generates the sensitivity metadata based on metadata received from each of a plurality of support agent nodes executed within the private deployment and the public deployment; the cross-process scheduling engine includes a tile segment worker that selectively segments work scenarios to provide sets of tile segments; defining a set of tile segments for the work scenario is executed in response to determining that the work scenario implicates one or more of security-sensitivity and compliance-sensitivity of each of one or more of data to be processed in the work scenario and one or more processes of the work scenario; and the public deployment is a public cloud and the private deployment is a private cloud in a hybrid cloud deployment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a cross-process dispatch service in hybrid cloud deployments. More particularly, implementations of the present disclosure are directed to a cross-process dispatch service in hybrid cloud deployments that dispatches processes of work scenarios with appropriate workloads for distribution between private cloud and public cloud systems. Implementations can include actions of receiving, by a cross-process scheduling engine executed within a cloud platform, work scenario metadata and sensitivity metadata, generating, by the cross-process scheduling engine, a lineage graph representing relationships between one or more of data and processes to be executed for a work scenario represented by the work scenario metadata, defining, by the cross-process scheduling engine, a set of tile segments for the work scenario based on the lineage graph and the sensitivity metadata, dispatching, by the cross-process scheduling engine, a first sub-set of tile segments for execution in a private deployment including one or more private nodes, and dispatching, by the cross-process scheduling engine, a second sub-set of tile segments for execution in a public deployment including one or more public nodes.

To provide further context for implementations of the present disclosure, and as introduced above, software systems can be provided in hybrid deployments that include a private deployment (e.g., on-premise, private cloud) and public deployment (e.g., public cloud). A hybrid deployment is typically used in instances of sensitive data and/or workflows, or otherwise providing enterprise-specific features and functionality that are unavailable through a public cloud. Further, hybrid cloud deployments provide enterprises with the benefits of modern cloud infrastructures and reduction in information technology (IT) burden. An example hybrid deployment can be provided using SAP HANA Cloud provide by SAP SE of Walldorf, Germany. It is contemplated, however, that implementations of the present disclosure can be realized with any appropriate hybrid cloud offering.

Hybrid deployments, however, raise numerous technical problems including, for example, data migration and replication between private deployments and public deployments, as well as data security and compliance. For example, data migration and data replication between a private cloud deployment and a public cloud deployment can be burdensome on technical resources expended to move and/or copy data. In some examples, a unit of data migration is defined by a volume management policy or pre-defined structured query language (SQL) meta-data mechanisms. Further, sensitive data and processes should remain in the private deployment (e.g., private cloud, on-premise) for security and compliance management. However, the inner structures of processes may include workflows that span the private deployment and the public deployment (i.e., distributed processing).

Implementations of the present disclosure address instances, in which processes and/or data that are executed on or maintained within a private deployment (e.g., on-premise, private cloud) are to be made available in a public deployment (i.e., public cloud). For example, an enterprise can execute one or more applications in support of its operations. Example applications can include, without limitation, one or more applications in an enterprise resource planning (ERP) suite. An application can execute on or more processes, each process can include process code (e.g., Java code), query statements (e.g., SQL statements), procedures, and the like. In some examples, the enterprise may need to make processes and/or data available to one or more external parties. Example external parties can include, without limitation, customers of the enterprise and contractors to the enterprise.

To achieve this, processes and/or data are migrated from a private deployment to a public deployment, the one or more external parties being provided access through the public deployment. An example system for migration from a private deployment (e.g., on-premise, private cloud) to a public deployment is described in detail in commonly assigned U.S. application Ser. No. 17/482,914, filed on Sep. 23, 2021, and entitled Cloud Migration for Legacy On-Premises Process Code, the disclosure of which is expressly incorporated herein by reference in the entirety for all purposes. However, and as introduced above, processes and/or data can be security- and/or compliance sensitive. Consequently, processes and/or data that are to be migrated should be analyzed to determine whether migration to a public deployment would not compromise security and/or compliance considerations. Processes and/or data, for which migration would not compromise security and/or compliance can be dispatched to a public deployment, while processes and/or data, for which migration would compromise security and/or compliance remain in the private deployment.

In view of the above context, implementations of the present disclosure provide a cross-process dispatch service in hybrid cloud deployments. As described in further detail herein, the cross-process dispatch service of the present disclosure interacts with and supports components and sub-services that form a backbone of hybrid cloud applications. In some examples, the cross-process dispatch service orchestrates and manages customer-facing applications that are deployed to and run on multiple-cloud environments. In some examples, the cross-process dispatch service automatically dispatches processes (e.g., work scenarios with appropriate workloads) for execution between private cloud and public cloud systems. Each of the public cloud and private cloud systems are configured based on pre-defined and updated data policies and process policies with proper compliance and data security (i.e., risk management).

As described in further detail herein, the cross-process dispatch service of the present disclosure provides technical advantages and improvements within hybrid cloud deployments. For example, the cross-process dispatch service enables execution throughput to be maximized (e.g., through distributed processing across public/private deployments) and development resource costs to be minimized (e.g., by leveraging the public deployment as much as possible). As another example, the cross-process dispatch service helps protect sensitive data and processes under complex structures with security and compliance policies (e.g., by maintaining data and/or processes that are security- and/or compliance-sensitive in the private deployment). As another example, the cross-process dispatch service reduces costs and expenditure of technical resources for cloud context construction and process re-definition under modern IT systems for enterprises (customers).

Figure 1:
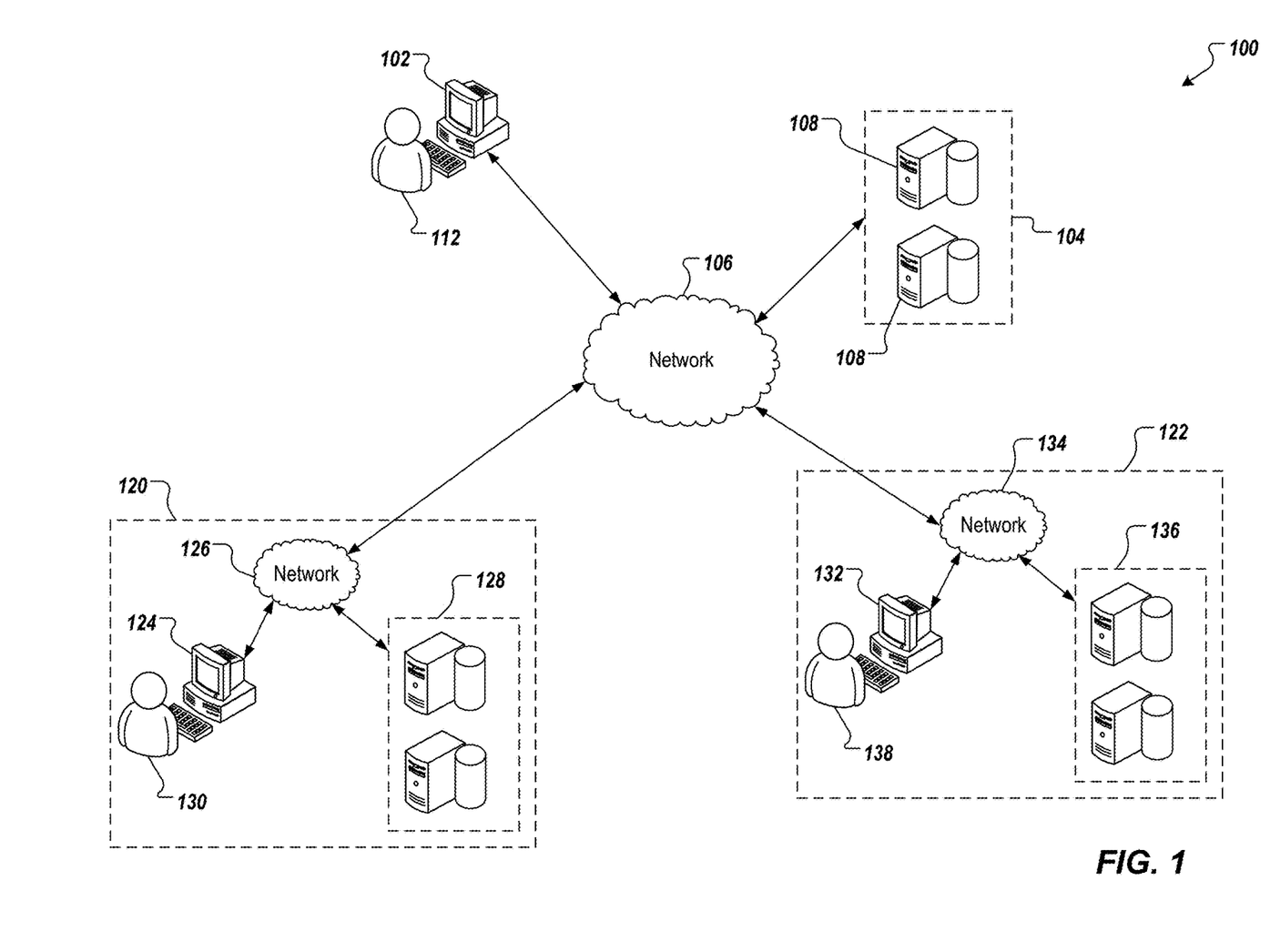
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102. In some examples, the server system 104 represents a public context of a hybrid deployment scenario, in which one or more components of a software system are provided as cloud-based components hosted in the server system 104.

The example architecture 100 of FIG. 1 further includes a first customer system 120 and a second customer system 122. The first customer system 120 includes a client device 124, a network 126, and a server system 128. The server system 128 includes one or more server devices and databases (e.g., processors, memory). In the depicted example, a user 130 interacts with the client device 124. The second customer system 120 includes a client device 132, a network 134, and a server system 136. The server system 136 includes one or more server devices and databases (e.g., processors, memory). In the depicted example, a user 138 interacts with the client device 124. In some examples, the server systems 128, 136 represent respective private contexts of a hybrid deployment scenario, in which one or more components of a software system are provided as private deployments (e.g., on-premise, private cloud) hosted in the server systems 128, 136.

In some examples, the client devices 102, 124, 132 can communicate with the server system 104 over the network 106. In some examples, the client devices 124, 132 can communicate with the server systems 128, 136 over the networks 126, 134, respectively. In some examples, the client devices 102, 124, 132 include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or any appropriate combination of any two or more of these devices or other data processing devices. In some implementations, the networks 106, 126, 134 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, and as noted above, the example of FIG. 1 can represent a hybrid deployment that provides a public deployment and multiple private deployments. For example, the server system 104 can host a public cloud system that is agnostic to multiple enterprises (customers) that use the public cloud system. As another example, the first customer system 120 can host a private cloud system that is specific to a first enterprise, and the second customer system 122 can host a private cloud system that is specific to a second enterprise. As described in further detail herein, implementations of the present disclosure provide a cross-process dispatch service that can be executed within the hybrid deployment. The cross-process dispatch service selectively dispatches processes and/or sub-processes for execution in respective cloud contexts (private, public).

As described in further detail herein, cross-process dispatch service of the present disclosure enables processes (e.g., execution of work scenarios) to be distributed and monitored in hybrid cloud deployments (e.g., a process of a work scenario executing in a public cloud and a process of the work scenario executing in a private cloud). More particularly, the cross-process dispatch service automatically executes cross-process dispatch with data categorization and prioritization across private deployments and public deployments.

In accordance with implementations of the present disclosure, and as described in further detail herein, a work scenario can be selectively segmented into a set of tile segments, each tile segment being executable as a segment of the work scenario. In some examples, each tile segment is designated as either executable in a public deployment or a private deployment. In some implementations, each tile segment includes process code, query statements, and data that is to be processed for a portion of the work scenario that the tile segmented is generated for. Tile segments implicating security- and/or compliance-sensitive data and/or processes are designated for processing in a private deployment, while tile segments that do not implicate security- and/or compliance-sensitive data and/or processes are designated for processing in a public deployment.

A work scenario can be described as one or more processes that are executed by an application (e.g., ERP application) in support of one or more operations of an enterprise. In some examples, each process can include a transaction or a string of transactions that are executed and implicate data (e.g., read data, write data, modify data) of the enterprise. Example work scenarios can include, without limitation, maintenance of master data (e.g., data representative of customers, vendors, materials, employees) and recording transactions (e.g., purchase orders, invoices, journal entries). In some examples, a work scenario can include process code, query statements (e.g., SQL statements), and data. In some examples, the process code is written in various different languages such as, for example, Java, Python, C++ and the like and may use various libraries, such as Java libraries, Python libraries, C++ libraries and/or the like. The process code can include calls to various functions set forth in libraries associated with the relevant programming language or with other environment-specific factors. In some examples, execution of a work scenario can touch multiple areas within the enterprise. Example areas can include, without limitation, accounting, financials, logistics, and the like, each of which can be provisioned using one or more other applications. That is, execution of a work scenario can implicate applications executing in one or more areas, as well as data associated with the areas.

Figure 2:
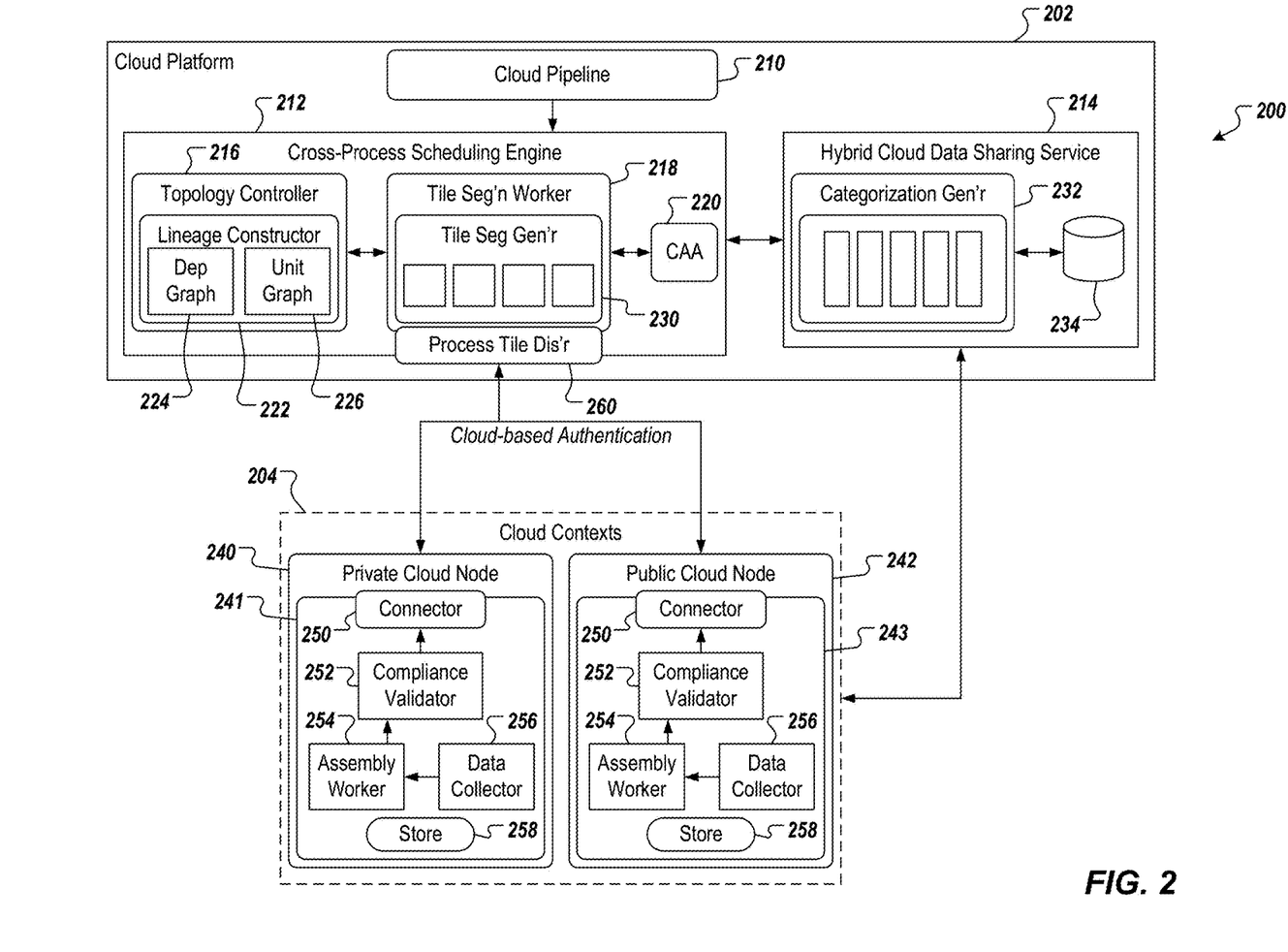
FIG. 2 depicts a conceptual architecture for a reliable cross-process dispatch service in accordance with implementations of the present disclosure.

FIG. 2 depicts an example conceptual architecture 200 in accordance with implementations of the present disclosure. In the depicted example, the conceptual architecture 200 includes a cloud platform 202 (e.g., SAP HANA Cloud) and cloud contexts 204.

In the example of FIG. 2, the cloud platform 202 includes a cross-process scheduling engine 212 and a hybrid cloud data sharing service 214. The cross-process scheduling engine 212 includes a topology controller 216, a tile segmentation worker 218, and a configuration assembly adapter (CAA) 220. The topology controller 216 includes a lineage constructor 222 having a dependency graph module 224 and a unit graph module 226. The tile segmentation worker 218 includes a tile segment generator 230. In some examples, the cross-process scheduling engine 212 is implemented as a container-based runtime context followed by fair-contest paradigm to each available node in the cloud contexts 204. The hybrid cloud data sharing service 214 includes a categorization generator 232 and a metadata store 234. In some examples, hybrid cloud data sharing service 214 is served by Docker image, which provides a runtime environment with data volume support and image registry administration. The agile demands of metadata intelligent hierarchical support can be relatively quickly updated by prepared operators. In some examples, the operators ensure that the overall system has the highlighted feature to achieve efficient performance and extensively concurrent throughput when data access interface is invoked.

In the example of FIG. 2, the cloud contexts 204 include a private cloud, represented by a private cloud node 240, and a public cloud, represented by a public cloud node 242. Although a single private cloud node 240 and a single public cloud node 242 are depicted, it is contemplated that the private cloud and/or the public cloud can each include any appropriate number of nodes. In some examples, the private cloud node 240 and the public cloud node 242 each have correct and compliant access permissions, which enables the cross-process scheduling engine 212 to react to any level of workloads when handling complicated work scenarios, each including one or more processes. The processes are designed to implement specified scheduling policies.

In accordance with implementations of the present disclosure, a cloud support agent (CSA) is executed within each of the nodes. In some examples, each CSA can be executed as a daemon process on a respective node. In the example of FIG. 2, a CSA 241 is executed in the private cloud node 240 and a CSA 243 is executed in the public cloud node 242. Each of the CSAs 241, 243 includes a connector 250, a compliance validation module 252, an assembly worker 254, a data collector 256, and a data store 258. In some examples, and as described in further detail herein, the cross-process scheduling engine 212 communicates with each of the private cloud node 240 and the public cloud node 242 through a process tile dispatcher 260 using cloud-based authentication. For example, the cross-process scheduling engine 212 communicates private cloud tile information to the private cloud node 240 and public cloud tile information to the public node 242. In this manner, and as described in further detail herein, the cross-process scheduling engine 212 can dispatch processes (and/or sub-processes) and associated data to respective cloud contexts (private cloud, public cloud).

In further detail, the hybrid cloud data sharing service 214 collects and manages hybrid cloud data from private and public deployment environments along with process and workload metadata. For example, the hybrid cloud data sharing service 214 receives respective process and workload metadata from the private cloud node 240 and the public cloud node 242. The hybrid cloud data sharing service 214 provides master data and schema-based metadata for processes that execute workloads. In some examples, the hybrid cloud data sharing service 214 prioritizes and partitions the metadata using a specified security and compliance policy matrix. The hybrid cloud data sharing service 214 applies cross-process, complicated work scenario data collection, dependency identification, and cloud context metadata maintenance. The categorization generator 232 aligns context and dependency information to provide a categorization and hierarchical construction of process data and workload metadata. That is, for example, the metadata can be categorized in terms of security and/or compliance to enable discerning of security- and/or compliance-sensitive data and/or processes. To achieve this, various customer-defined labels and automation data tags can be consumed. A dependency structure is constructed, and a data access interface is established that has a specified authorization to support standardized data access In some implementations, the cross-process scheduling engine 212 collects work scenarios and analyzes ownership and lineage relationship of cross-process work scenarios with workloads as represented in work scenario metadata. The cross-process scheduling engine 212 constructs and manages a topology of cross-process SQL statements, for example, based on the work scenario metadata that is generated from the perspective of customer and compliance demands.

In further detail, the cross-process scheduling engine 212 analyzes the work scenario metadata to construct a lineage and generate a topology with cloud context awareness. In some examples, the lineage is provided as a data structure that represents an inner structure and correlated mapping relationships indexed or tagged by data owners from various areas within an enterprise (e.g., accounting, finance, logistics, data repositories). In some examples, the topology is provided as a data structure that represents definitive relationships and relevant structures of different communicative components among the hybrid cloud contexts. For example, applications (e.g., ERP, CRM, HCM), which share data and coordinate tasks to perform the work scenarios constructed the overall hybrid cloud working topology. This topology is the guideline to make sure the work scenario could dispatch the proper functionality and data to the proper units within the overall topology.

The cross-process scheduling engine 212 is able to dispatch proper and compliant tile segments to appropriate cloud contexts (public, private). For example, processes with workloads involving sensitive data are scheduled and executed on the private cloud, while archived large volume data manipulation is scheduled and persisted on the public cloud. The cross-process scheduling engine 212 applies an adaptable mechanism to form the well-defined lineage tiles analyzed from the metadata provided from the hybrid cloud data sharing service 214. Further, the cross-process scheduling engine 212 applies appropriate security and compliance policies.

In some examples, the topology controller 216 processes work scenario metadata representative of a respective work scenario to provide a lineage graph. The dependency graph module 226 provides a dependency graph as a data structure that is used to manage the information of relationships among various components and libraries within the hybrid cloud. In some examples, each unit of the dependency graph is the compound structure to manage and store the metadata that can be used to invoke sequence and execution links of the work scenarios. Each unit of the dependency graph is used as a guideline and constraint rule when making tile segments for the dispatch service. In some examples, the lineage graph, introduced above, has a two-layered internal structure. An outer layer is provided for work scenario versioning history data when work scenarios are updated, so there will be certain corresponding structure information for the dependency graph runtime instance accordingly. An inner layer is the dependency graph, which represents the up-to-date runtime lineage information, which can be used to make proper tile segments in the hybrid cloud context.

In some examples, the tile segmentation worker 218 generates tile segments for work scenarios. For example, the tile segmentation worker 218 processes a lineage graph generated by the topology controller 216 in view of metadata provided by the hybrid cloud data sharing service 214 to identify any security- and/or compliance-sensitive data and/or processes implicated by a work scenario. For example, the metadata can indicate that particular data is security-sensitive and the lineage graph can indicate that the particular data is implicated in the work scenario. If the work scenario security- and/or compliance-sensitive data and/or processes, the tile segment generator 230 segments the work scenario into a set of tile segments. In some examples, each tile segment is designated as non-sensitive, in other words, available for execution in a public deployment, or is designated as sensitive, in other words, only executable in a private deployment.

In some implementations, the tile segment worker 218 determines where to create tile segments and maintains dependencies between tile segments. In some examples, predefined segmentation configurations and deployment policies by the work scenario owners. The dispatch service can analyze and extract the related information, and automatically generate the related dependency and lineage graph from the code perspective. Subsequently, when the actual execution of the work scenario begins, the dispatch service can provide off-line or runtime dynamic execution modes to judge and separate the related libraries wrapped into proper cloud patterns, as tile segment units are needed. In some examples, data output of one tile segment is to be passed between the cloud context for input to another tile segment. To achieve this, metadata and predefined relationships among the tile segments and the corresponding data dependency is provided. In some examples, the data dependency is required among the tile segments when there are only specific intermediate data requirements and the local execution environment of the tile segment can be cached to wait for the remote tile segment execution to complete. In some example, when the data dependency is required under the circumstances that data should be used among tile segments or segment combinations among hybrid cloud context, the hybrid cloud data sharing service 214 can be used to make the data accessed among hybrid cloud contexts with specified data access controls.

In some examples, the CAA 220 extracts configuration information from the respective CSAs 241, 243 to provide cloud-oriented configuration definitions for each of the public cloud and private cloud deployment environments. The CAA 220 is designed to suit for the condition that each cloud context required different configuration information when executing tile segments. The CAA 220 has bidirectional capability during the process of dispatch service. In some examples, the CAA 220 evaluates validity of the metadata of the tile segments generated before pushing the tiles segments to the hybrid cloud data sharing service 214. In some examples, when data dependency is required among the tile segments within the hybrid cloud context (e.g., data is to be consumed with appropriate and granted access permissions), the data is pulled from the hybrid cloud data sharing service 214, and before being provided to the tile segment worker 218, the CAA220 validates the relevant data compliance and access control fetched from a cloud compliance policy. If validated, the data is allowed to be consumed by the runtime data dependency structure among the tile segments.

In some examples, the process tile dispatcher 260 dispatches tile segments and associated data to respective cloud contexts (private cloud, public cloud). In some examples, a dispatch can include work scenario code and associated metadata of the tile segment that can be processed by an appropriate node (private, public) to execute a portion of the work scenario. The process tile dispatcher 260 includes the required authentication identification service and token-based access control service to communicate with the private cloud node 240 and the public cloud node 242 using appropriate cloud-based authentication.

In some examples, each CSA 241, 243 collects and monitors the execution runtime status of each of the private cloud node 240 and the public cloud node 242. For example, each CSA 241, 243 monitors, records, and uploads predefined data frames and profiles of the private cloud node 240 and the public cloud node 242, respectively. In some examples, each CSA 241, 243 applies data security and data compliance policies to determine metadata that is to be provided to the hybrid cloud data sharing service 214, the metadata being descriptive of the configuration and dependencies of the respective cloud contexts. That is, for example, before uploading the data and relevant metadata from the cloud contexts to the hybrid cloud data sharing service 214, any required data security and compliance approaches are executed to refresh the data with standardized formats.

In further detail, the data collector 246 of each CSA 241, 243 collects data representative of the configuration and dependencies of the respective cloud context. In some examples, the data is stored in the data store 258. In some examples, the data is provided to the assembly worker 254, which assembles the data into an appropriate format and provides a set of data. In some examples, the assembly worker 254 assembles data with proper cloud compliance tags, which are used for cloud compliance and security services. In some examples, the assembly worker 254 provides a specified data set that is needed to deploy and maintain on a specified cloud context (e.g., constrained in private cloud data repository or public cloud data storage). In some examples, the assembly worker 254 assembles the related metadata of proper tile segments which will be constructed (e.g., execution work scenario's context information, relevant public cloud deployment configuration information, and dispatch operation related metadata).

In some examples, the compliance validation module 252 applies data security and compliance policies to the set of data received from the assembly worker 254 to selectively filter data from the set of data. That is, for example, any data/metadata, the export of which would violate a policy, is removed from the set of data to provide a sub-set of data. The sub-set of data is exported to the hybrid cloud data sharing service 214 through the connector 250.

Figure 3:
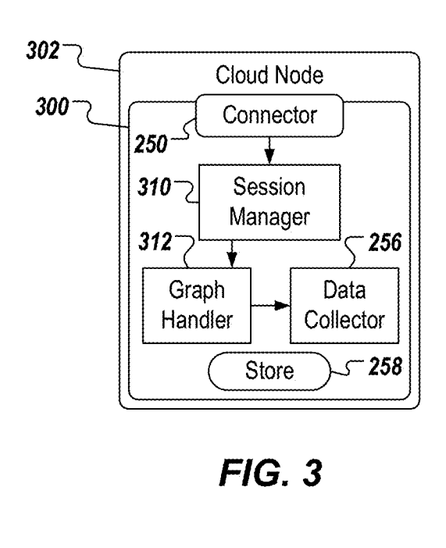
FIG. 3 depicts a representation of a cloud support agent in accordance with implementations of the present disclosure.

FIG. 3 depicts a representation of a CSA 300 within a cloud node 302 in accordance with implementations of the present disclosure. In the example of FIG. 3, the CSA 300 includes the connector 250, a session manager 310, a graph handler 312, the data collector 256, and the data store 258. Although not depicted in FIG. 2, each of the CSA 241, 243 can also include a session manager and a graph module 312. As discussed herein, CSAs, such as the CSA 300, provides for distributed collection and resolution for cloud node, and thus serves as an agent that provides information regarding the execution status of a respective cloud node. In some examples, the graph handler 312 manages integrated and enterprise-defined compliance policies. For example, the graph handler 312 manipulates complex relationships and dependencies within the respective cloud context.

In some examples, FIG. 3 depicts how each distributed node is deployed in the hybrid cloud environment (e.g., private cloud service node, public cloud service node). Each of the cloud nodes 302 has the capability to execute the dispatched execution work scenario under the control of the central cross-process scheduling engine of the dispatch service. Also, each cloud node 302 records and uploads runtime data for execution of part of the work scenario (e.g., by other nodes 302). Based on that result, the central scheduling engine can use the collected and collaborative data as feedback to make the scheduling and segmentation agile and available.

In further detail, the CSA 300 generates dependency data representative of dependencies of the process code, for example. This can include environment-specific dependencies, such as dependencies on a programming language library and/or dependencies based on other libraries (e.g., database system libraries). In some examples, the CSA 300 generates the dependency data by examining process code to identify libraries used by the process code. For example, the process code can utilize one or more libraries. Example libraries can include, without limitation, *.so files in a Linux arrangement, *.dll or *.exe files in a Microsoft Windows arrangement, or similar libraries in different arrangements. The access control, data integration, and/or other techniques can be described by libraries invoked by the process code.

The CSA 300 can generate dependency data by examining and recording the libraries invoked by the process code. The dependency data may be provided to the hybrid cloud data sharing service 214 as configuration metadata. In some examples, the graph handler 312 generates the dependency data. The dependency data may take different forms (e.g., list, graph), for example, based on the volume of concurrent requests coming to the CSA 300. In some examples, the data collector 256 consumes the outcome of the local execution of part of the work scenario. After that, according to the specific hybrid cloud context requirement, the data is constructed and wrapped into the defined formation to the assembly worker 254.

In some examples, the CSA 300 provides connection information about the process code. The connection information may include, for example, an indication of the port mechanism used by the process code to access data (e.g., within a database system). In some examples, the connection information includes metadata about the process code including, for example, an authentication mechanism used. Connection information can also include database protocol messages and replies thereto.

Referring again to FIG. 2, and as described herein, the cloud cross-process scheduling engine 212 executes the topology controller 216, the tile segmentation worker 218, and the CAA 220 to dispatch a process for execution to a private cloud node 240 or a public cloud node 242. In some examples, the cloud cross-process scheduling engine 212 determines the dispatches based on metadata provided from the hybrid cloud data sharing service 214, the metadata being, at least in part, representative of compliance and code requirements received from respective CSAs 241, 243. In some examples, the cloud cross-process scheduling engine 212 employs compliance policy operators to apply various workflows to consume and regenerate, often complex, SQL code. From the perspective of private cloud node 240 and the public cloud node 242, the SQL process code and data that is received is transparent. As described herein, the tile segmentation worker 218 processes a lineage graph generated by the topology controller 216 to partition a SQL process into appropriate cloud contexts and provide respective tile segments that are dispatched to respective cloud contexts by the process tile dispatcher 260.

As described in further detail herein, the process tile dispatcher 260 provides compliance validation mapping, metadata indicator packaged and process tile dispatch operation. The compliance validation mapping operator generates the specific and applicable process tile with accurate and compliant configuration files, which is required by separate cloud environment. The metadata indicator is shared by similar private or public cloud nodes with proper modification after support agent checked the flexible execution context difference. This aims to apply the demands of tile dispatch and get expected result from each cloud node. As a result, the dispatcher takes the role of sending pre-defined data structure including process category ID, business compliance policy indicator and other information with the process to fulfill the goal of execution on different cloud environments.

Figure 4:
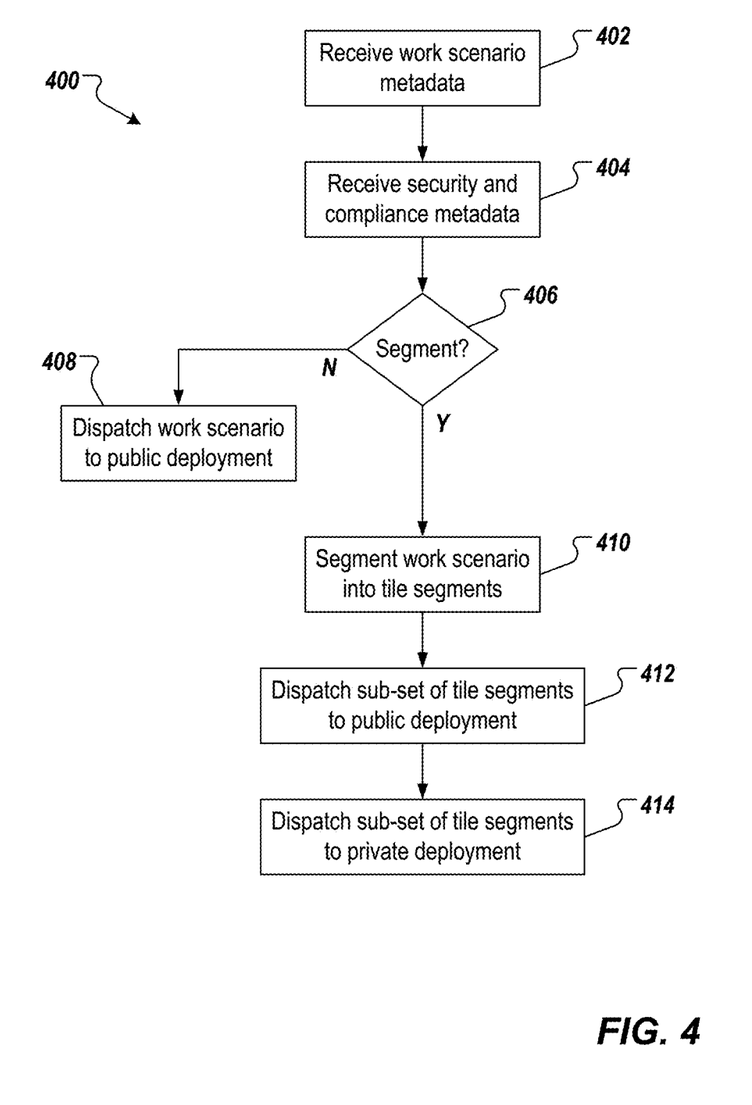
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Work scenario metadata is received (402). For example, and as described herein, the cloud cross-process scheduling engine 212 of FIG. 2 receives work scenario metadata for a respective work scenario. In some examples, the work scenario is to be executed for an external party. As described herein, the work scenario metadata represents ownership and lineage relationships with respect to areas, data, processes, applications, and the like that execution of the work scenario implicates. Security and compliance metadata is received (404). For example, and as described herein, security and compliance metadata is provided to the cloud cross-process scheduling engine 212 from the hybrid cloud data sharing service 214. In some examples, and as described herein, the security and compliance metadata is generated by the hybrid cloud data sharing service 214 based on metadata received from each of the CSAs 241, 243 of the private cloud node 240 and the public cloud node, respectively.

It is determined whether the work scenario is to be segmented (406). For example, and as described herein, the work scenario metadata is processed by the topology controller 216 to generate a lineage graph that is provided to the tile segmentation worker 218. The tile segmentation worker 218 processes the lineage graph and the security and compliance metadata to determine whether the work scenario implicates security- and/or compliance-sensitive data and/or processes. As described herein, if the work scenario implicates security- and/or compliance-sensitive data and/or processes, it is determined that the work scenario is to be segmented. If the work scenario does not implicate security- and/or compliance-sensitive data and/or processes, it is determined that the work scenario is not to be segmented.

If it is determined that the work scenario is not to be segmented, the work scenario is dispatched to a public deployment for execution (408). For example, and as described herein, the entirety of the work scenario (data, processes) can be dispatched to the public cloud node 242 for execution, as there are no security and/or compliance concerns. If it is determined that the work scenario is to be segmented, the work scenario is segmented into a set of tile segments (410). For example, and as described herein, the tile segmentation worker 218 segments the work scenario into a set of tile segments. In some examples, each tile segment is executable as a segment of the work scenario. In some examples, each tile segment is designated as either executable in a public deployment or a private deployment. In some examples, each tile segment includes process code, query statements, and data that is to be processed for a portion of the workflow that the tile segmented is generated for.

A sub-set of tile segments is dispatched to the public deployment for execution (412). For example, and as described herein, the process tile dispatcher 260 dispatches a sub-set of tile segments to the public cloud node 242 for execution, the sub-set of tile segments including one or more tile segments having no security and/or compliance concerns. A sub-set of segments is dispatched to a private deployment for execution (414). For example, and as described herein, the process tile dispatcher 260 dispatches a sub-set of tile segments to the private cloud node 240 for execution, the sub-set of tile segments including one or more tile segments having security and/or compliance concerns.

Figure 5:
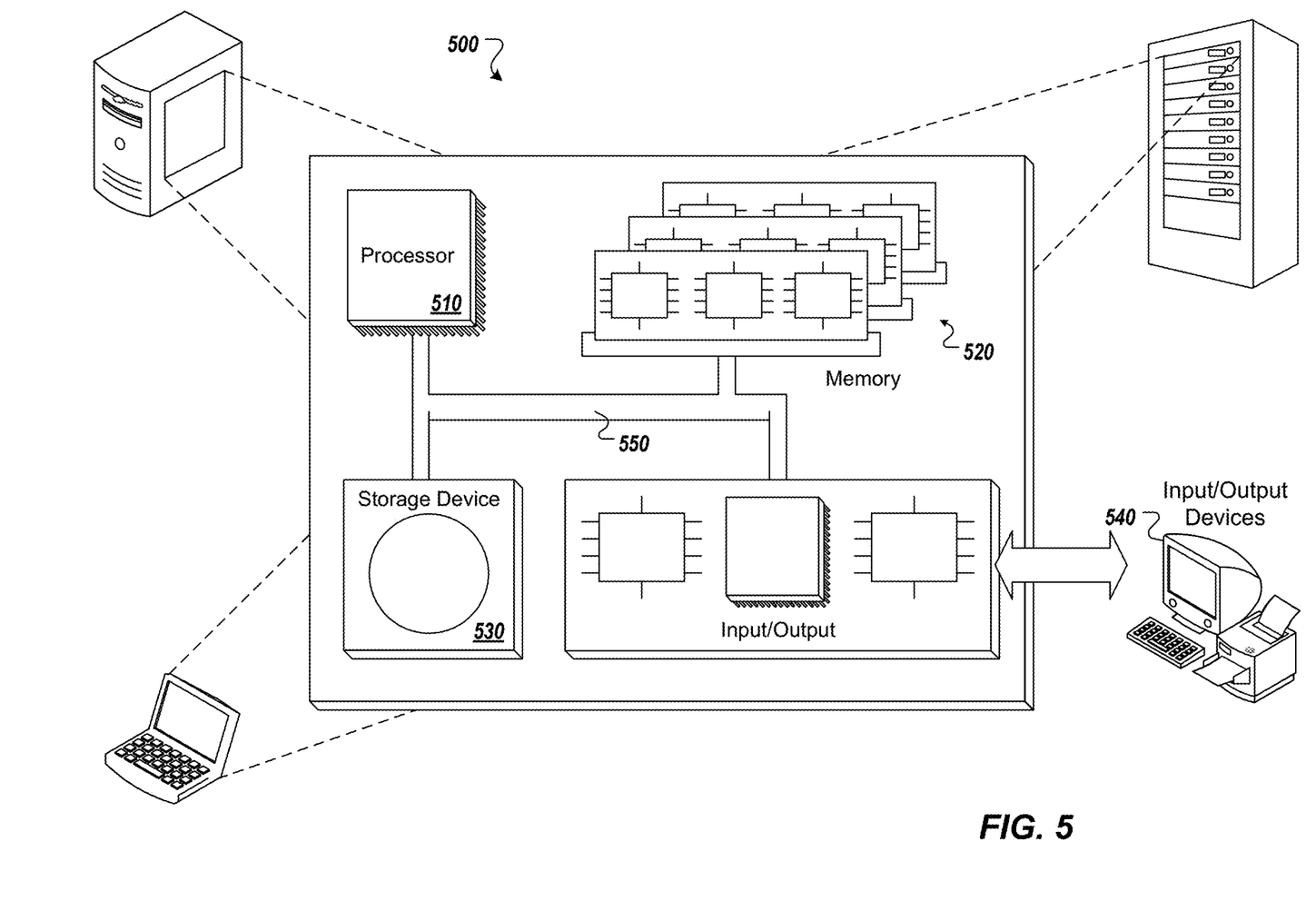
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively dispatching work scenarios between public deployments and private deployments, the method being executed by one or more processors and comprising:
   generating, by the cross-process scheduling engine executed within a cloud platform, a lineage graph representing relationships between one or more of data and processes to be executed for a work scenario represented by work scenario metadata, the lineage graph comprising an outer layer for work scenario versioning history data representative of updates to the work scenario and an inner layer comprising a dependency graph representing up-to-date runtime lineage information for execution of the work scenario;

defining, by the cross-process scheduling engine and using the dependency graph, a set of tile segments for the work scenario based on the work scenario metadata and sensitivity metadata, each tile segment being designated as one of sensitive and non-sensitive and comprising process code, query statements, and data for execution of a portion of the work scenario, wherein a first tile segment has a dependency on a second tile segment as defined in the dependency graph;

dispatching, by the cross-process scheduling engine, a first sub-set of tile segments for execution in a private deployment comprising one or more private nodes, the first sub-set of tile segments comprising the first tile segment that is executed by a private node of the one or more private nodes;

dispatching, by the cross-process scheduling engine, a second sub-set of tile segments for execution in a public deployment comprising one or more public nodes, the second sub-set of tile segments comprising the second tile segment that is executed by a public node of the one or more public nodes; and coordinating, by a cloud data sharing service, data flow between the private node and the public node for respective execution of the first tile segment and the second tile segment based on the dependency.

2. The method of claim 1, further comprising:

executing a private support agent within each private node of the one or more private nodes, the private support agent providing private node metadata to the cloud data sharing service; and executing a public support agent within each public node of the one or more public nodes, the public support agent providing public node metadata to the cloud data sharing service.

3. The method of claim 1, wherein the sensitivity metadata comprises an indication of one or more of security-sensitivity and compliance-sensitivity of each of one or more of data to be processed in the work scenario and one or more processes of the work scenario.

4. The method of claim 1, wherein the sensitivity metadata is provided to the cross-process scheduling engine from the cloud data sharing service that generates the sensitivity metadata based on metadata received from each of a plurality of support agent nodes executed within the private deployment and the public deployment.

5. The method of claim 1, wherein the cross-process scheduling engine comprises a tile segment worker that selectively segments work scenarios to provide sets of tile segments.

6. The method of claim 1, wherein defining a set of tile segments for the work scenario is executed in response to determining that the work scenario implicates one or more of security-sensitivity and compliance-sensitivity of each of one or more of data to be processed in the work scenario and one or more processes of the work scenario.

7. The method of claim 1, wherein the public deployment comprises a public cloud and the private deployment comprises a private cloud in a hybrid cloud deployment.

8. A non-transitory computer-readable storage medium coupled to one or more processors and having instructions stored thereon which, when executed by the one or more processors, cause the one or more processors to perform operations for selectively dispatching work scenarios between public deployments and private deployments, the operations comprising:

generating, by the cross-process scheduling engine executed within a cloud platform, a lineage graph representing relationships between one or more of data and processes to be executed for a work scenario represented by work scenario metadata, the lineage graph comprising an outer layer for work scenario versioning history data representative of updates to the work scenario and an inner layer comprising a dependency graph representing up-to-date runtime lineage information for execution of the work scenario;

defining, by the cross-process scheduling engine and using the dependency graph, a set of tile segments for the work scenario based on the work scenario metadata and sensitivity metadata, each tile segment being designated as one of sensitive and non-sensitive and comprising process code, query statements, and data for execution of a portion of the work scenario, wherein a first tile segment has a dependency on a second tile segment as defined in the dependency graph;

dispatching, by the cross-process scheduling engine, a first sub-set of tile segments for execution in a private deployment comprising one or more private nodes, the first sub-set of tile segments comprising the first tile segment that is executed by a private node of the one or more private nodes;

dispatching, by the cross-process scheduling engine, a second sub-set of tile segments for execution in a public deployment comprising one or more public nodes, the second sub-set of tile segments comprising the second tile segment that is executed by a public node of the one or more public nodes; and coordinating, by a cloud data sharing service, data flow between the private node and the public node for respective execution of the first tile segment and the second tile segment based on the dependency.

9. The non-transitory computer-readable storage medium of claim 8, wherein operations further comprise:

executing a private support agent within each private node of the one or more private nodes, the private support agent providing private node metadata to the cloud data sharing service; and executing a public support agent within each public node of the one or more public nodes, the public support agent providing public node metadata to the cloud data sharing service.

10. The non-transitory computer-readable storage medium of claim 8, wherein the sensitivity metadata comprises an indication of one or more of security-sensitivity and compliance-sensitivity of each of one or more of data to be processed in the work scenario and one or more processes of the work scenario.

11. The non-transitory computer-readable storage medium of claim 8, wherein the sensitivity metadata is provided to the cross-process scheduling engine from the cloud data sharing service that generates the sensitivity metadata based on metadata received from each of a plurality of support agent nodes executed within the private deployment and the public deployment.

12. The non-transitory computer-readable storage medium of claim 8, wherein the cross-process scheduling engine comprises a tile segment worker that selectively segments work scenarios to provide sets of tile segments.

13. The non-transitory computer-readable storage medium of claim 8, wherein defining a set of tile segments for the work scenario is executed in response to determining that the work scenario implicates one or more of security-sensitivity and compliance-sensitivity of each of one or more of data to be processed in the work scenario and one or more processes of the work scenario.

14. The non-transitory computer-readable storage medium of claim 8, wherein the public deployment comprises a public cloud and the private deployment comprises a private cloud in a hybrid cloud deployment.

15. A system, comprising:
a computing device; and
a non-transitory computer-readable storage device coupled to the computing device and having instructions stored thereon which, when executed by the computing device, cause the computing device to perform operations for natural language explanations for selectively dispatching work scenarios between public deployments and private deployments, the operations comprising:
generating, by the cross-process scheduling engine executed within a cloud platform, a lineage graph representing relationships between one or more of data and processes to be executed for a work scenario represented by work scenario metadata, the lineage graph comprising an outer layer for work scenario versioning history data representative of updates to the work scenario and an inner layer comprising a dependency graph representing up-to-date runtime lineage information for execution of the work scenario;
defining, by the cross-process scheduling engine and using the dependency graph, a set of tile segments for the work scenario based on the work scenario metadata and sensitivity metadata, each tile segment being designated as one of sensitive and non-sensitive and comprising process code, query statements, and data for execution of a portion of the work scenario, wherein a first tile segment has a dependency on a second tile segment as defined in the dependency graph;
dispatching, by the cross-process scheduling engine, a first sub-set of tile segments for execution in a private deployment comprising one or more private nodes, the first sub-set of tile segments comprising the first tile segment that is executed by a private node of the one or more private nodes;
dispatching, by the cross-process scheduling engine, a second sub-set of tile segments for execution in a public deployment comprising one or more public nodes, the second sub-set of tile segments comprising the second tile segment that is executed by a public node of the one or more public nodes; and
coordinating, by a cloud data sharing service, data flow between the private node and the public node for respective execution of the first tile segment and the second tile segment based on the dependency.

16. The system of claim 15, wherein operations further comprise:
executing a private support agent within each private node of the one or more private nodes, the private support agent providing private node metadata to the cloud data sharing service; and
executing a public support agent within each public node of the one or more public nodes, the public support agent providing public node metadata to the cloud data sharing service.

17. The system of claim 15, wherein the sensitivity metadata comprises an indication of one or more of security-sensitivity and compliance-sensitivity of each of one or more of data to be processed in the work scenario and one or more processes of the work scenario.

18. The system of claim 15, wherein the sensitivity metadata is provided to the cross-process scheduling engine from the cloud data sharing service that generates the sensitivity metadata based on metadata received from each of a plurality of support agent nodes executed within the private deployment and the public deployment.

19. The system of claim 15, wherein the cross-process scheduling engine comprises a tile segment worker that selectively segments work scenarios to provide sets of tile segments.

20. The system of claim 15, wherein defining a set of tile segments for the work scenario is executed in response to determining that the work scenario implicates one or more of security-sensitivity and compliance-sensitivity of each of one or more of data to be processed in the work scenario and one or more processes of the work scenario.

\* \* \* \* \*